US012656848B1

(12) United States Patent
Lee

(10) Patent No.: US 12,656,848 B1
(45) Date of Patent: Jun. 16, 2026

(54) ACCELERATOR SYSTEM AND POWER MANAGEMENT METHOD THEREOF

(71) Applicant: REBELLIONS INC., Seongnam-si (KR)

(72) Inventor: Jaebong Lee, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/449,298

(22) Filed: Jan. 14, 2026

(30) Foreign Application Priority Data

Jan. 14, 2025 (KR) ........................ 10-2025-0005128

(51) Int. Cl.
 *G06F 1/26* (2006.01)
 *G06F 1/3228* (2019.01)
 *G06F 1/3203* (2019.01)
(52) U.S. Cl.
 CPC .......... *G06F 1/3228* (2013.01); *G06F 1/3203* (2013.01)
(58) Field of Classification Search
 CPC .................................................... G06F 1/3228
 USPC ......................................................... 713/320
 See application file for complete search history.

(56) References Cited

U.S. PATENT DOCUMENTS

| | | | | |
|---|---|---|---|---|
| 12,248,357 B1 * | 3/2025 | Ahmad | ................... | G06N 20/00 |
| 2001/0052800 A1 * | 12/2001 | Mizuno | ................... | G06F 1/324 |
| | | | | 327/1 |
| 2008/0022140 A1 * | 1/2008 | Yamada | ................ | G06F 1/3237 |
| | | | | 713/300 |

| | | | | |
|---|---|---|---|---|
| 2009/0256607 A1 * | 10/2009 | Smith | ....................... | G06F 1/32 |
| | | | | 327/198 |
| 2014/0028692 A1 | 1/2014 | Kim et al. | | |
| 2018/0203498 A1 | 7/2018 | Song et al. | | |
| 2019/0018469 A1 * | 1/2019 | Su | ......................... | G06F 1/3203 |
| 2019/0129490 A1 | 5/2019 | Han et al. | | |

(Continued)

FOREIGN PATENT DOCUMENTS

| | | |
|---|---|---|
| KR | 10-2014-0013652 A | 2/2014 |
| KR | 10-2018-0085605 A | 7/2018 |

(Continued)

OTHER PUBLICATIONS

Office Action for KR 10-2025-0005128 by Korean Intellectual Property Office dated Jul. 18, 2025.

(Continued)

*Primary Examiner* — Volvick Derose
(74) *Attorney, Agent, or Firm* — BROADVIEW IP LAW, PC

(57) ABSTRACT

An accelerator system according to an embodiment of the present disclosure includes at least one SOC and a board level management module configured separately from the at least one SOC and connected to the at least one SOC, and the board level management module is configured to monitor average power consumption of the at least one SOC according to a predetermined period during a duration of a task in response to the task being performed in the at least one SOC, determine whether monitored average power consumption is within a threshold range determined based on a power consumption budget defined for the duration, and transmit, to the at least one SOC, a first control signal related to reduction of power consumption of the at least one SOC in response to determining that the average power consumption is within the threshold range.

16 Claims, 11 Drawing Sheets

(56) References Cited

U.S. PATENT DOCUMENTS

| | | | |
|---|---|---|---|
| 2019/0129498 A1* | 5/2019 | Leung .................. | G06F 1/3287 |
| 2020/0201408 A1* | 6/2020 | Lehwalder ............... | G06F 1/28 |
| 2021/0208663 A1* | 7/2021 | Cooper .................... | G06F 1/28 |
| 2022/0083124 A1* | 3/2022 | Tung .................... | G06F 1/3206 |
| 2022/0382319 A1* | 12/2022 | Kim ........................ | G06F 1/08 |
| 2022/0413582 A1* | 12/2022 | Naveh .................. | G06F 1/3206 |
| 2023/0004430 A1* | 1/2023 | Richmond ............ | G06N 3/063 |
| 2023/0098742 A1* | 3/2023 | Wang .................. | G06F 1/3296 |
| | | | 713/323 |
| 2023/0229129 A1 | 7/2023 | Sodani et al. | |
| 2024/0004725 A1* | 1/2024 | Jain ...................... | G06F 9/5038 |
| 2024/0053809 A1 | 2/2024 | Kim | |
| 2024/0281044 A1* | 8/2024 | Alton .................. | G06F 1/3296 |
| 2024/0427368 A1* | 12/2024 | Koorapati ................ | G06F 1/08 |
| 2025/0085765 A1* | 3/2025 | Nge ...................... | G06F 1/3212 |
| 2025/0208682 A1* | 6/2025 | Noguera Serra ......... | G06F 1/28 |

FOREIGN PATENT DOCUMENTS

| | | | |
|---|---|---|---|
| KR | 10-2019-0048204 A | 5/2019 | |
| KR | 10-2022-0159029 A | 12/2022 | |
| KR | 10-2024-0005970 A | 1/2024 | |
| KR | 10-2024-0022968 A | 2/2024 | |
| KR | 10-2643032 B1 | 3/2024 | |

OTHER PUBLICATIONS

Ottaviano, Alessandro et al., "ControlPULP: A RISC-V On-Chip Parallel Power Controller for Many-Core HPC Processors with FPGA-Based Hardware-In-The-Loop Power and Thermal Emulation," International Journal of Parallel Programming. Feb. 2024. DOI: 10.1007/s10766-024-00761-4.

* cited by examiner

ACCELERATOR SYSTEM AND POWER MANAGEMENT METHOD THEREOF

CROSS-REFERENCE TO RELATED APPLICATION

This application claims priority to Korean Patent Application No. 10-2025-0005128, filed in the Korean Intellectual Property Office on Jan. 14, 2025, the entire contents of which are hereby incorporated by reference.

BACKGROUND

Field

Aspects of some embodiments of the present disclosure relate to an accelerator system and a power management method thereof.

Description of Related Art

Techniques for improving power management of an accelerator system specialized for neural network operations are being proposed. For example, an accelerator system may include a system on chip (SOC) in which various components are integrated, and may operate a mechanism for optimizing a balance between performance and power management of components by dynamically controlling power consumption of the SOC. However, according to the related art, a specific component configured to monitor and control power consumption of an SOC is also integrated and disposed in the SOC, and such a specific component may restrict a spatial design for the SOC or hinder a low-power design advantage of the SOC according to integration of components.

The above-described content is provided as background technology for the purpose of helping understanding of the present disclosure, and no claim or determination is raised as to whether it can be applied as related art related to the present disclosure.

SUMMARY

The present disclosure provides an accelerator system and a power management method thereof for solving the problems as described above.

Technical problems to be solved by the present disclosure are not limited to the above-mentioned content, and other problems not mentioned may be clearly understood by those skilled in the art from various embodiments described below.

The present disclosure may be implemented in various ways including a method, a system (or, an electronic device), and/or a computer program stored in a readable recording medium.

An accelerator system according to an embodiment of the present disclosure may include at least one system on chip (SOC) and a board level management module configured separately from the at least one SOC and connected to the at least one SOC, and the board level management module may be configured to monitor average power consumption of the at least one SOC according to a predetermined period during a duration of a task in response to the task being performed in the at least one SOC, determine whether the monitored average power consumption is within a threshold range determined based on a power consumption budget defined for the duration, and transmit, to the at least one SOC, a first control signal related to reduction of power consumption of the at least one SOC in response to determining that the average power consumption is within the threshold range.

According to an embodiment of the present disclosure, the accelerator system may further include a communication interface, and the board level management module may be further configured to receive information regarding a power consumption budget from an external electronic device through the communication interface.

According to an embodiment of the present disclosure, the first control signal may include a signal that triggers reduction of an operating frequency of at least one component included in the at least one SOC.

According to an embodiment of the present disclosure, the first control signal may include a signal that triggers quality of service (QOS) control of the at least one SOC.

According to an embodiment of the present disclosure, the board level management module may be further configured to monitor the average power consumption of the at least one SOC according to a predetermined period after transmitting the first control signal, determine whether the monitored average power consumption is within the threshold range, and transmit, to the at least one SOC, a second control signal related to an increase of power consumption of the at least one SOC, in response to determining that the average power consumption is not within the threshold range.

According to an embodiment of the present disclosure, the accelerator system may further include at least one analog to digital converter (ADC), and the board level management module may be further configured to acquire information regarding average power consumption from the at least one ADC.

According to an embodiment of the present disclosure, the at least one SOC may include at least one first pin connected to at least one first power domain related to a compute workload and at least one second pin connected to at least one second power domain related to a memory workload, and the board level management module may include a plurality of third pins respectively connected to the at least one first pin and the at least one second pin.

According to an embodiment of the present disclosure, the accelerator system may further include at least one first ADC corresponding to the at least one first power domain and at least one second ADC corresponding to the at least one second power domain, and the board level management module may be further configured to acquire information regarding power consumption of the at least one first power domain from the at least one first ADC and acquire information regarding power consumption of the at least one second power domain from the at least one second ADC.

According to an embodiment of the present disclosure, the board level management module may be further configured to determine, based on information regarding power consumption of each of the at least one first power domain and the at least one second power domain, at least one fourth pin for transmitting the first control signal among the plurality of third pins.

According to an embodiment of the present disclosure, the board level management module may be further configured to identify, based on information regarding power consumption of each of the at least one first power domain and the at least one second power domain, that power consumption of the at least one first power domain related to the compute workload is greater than power consumption of the at least one second power domain related to the memory workload, and determine at least one pin connected to the at least one first pin among the plurality of third pins as the at least one fourth pin in response to identifying that power consumption of the at least one first power domain is greater.

According to an embodiment of the present disclosure, the board level management module may be further configured to identify, based on information regarding power consumption of each of the at least one first power domain and the at least one second power domain, that power consumption of the at least one second power domain related to the memory workload is greater than power consumption of the at least one first power domain related to the compute workload, and determine at least one pin connected to the at least one second pin among the plurality of third pins as the at least one fourth pin in response to identifying that power consumption of the at least one second power domain is greater.

A power management method of an accelerator system including at least one SOC and a board level management module configured separately from the at least one SOC and connected to the at least one SOC according to an embodiment of the present disclosure may include monitoring, by the board level management module, average power consumption of the at least one SOC according to a predetermined period during a duration of a task in response to the task being performed in the at least one SOC, determining, by the board level management module, whether the monitored average power consumption is within a threshold range determined based on a power consumption budget defined for the duration, and transmitting, by the board level management module, a first control signal related to reduction of power consumption of the at least one SOC to the at least one SOC in response to determining that the average power consumption is within the threshold range.

According to an embodiment of the present disclosure, the power management method may further include receiving, by the board level management module, information regarding the power consumption budget from an external electronic device.

According to an embodiment of the present disclosure, the first control signal may include at least one of a signal that triggers reduction of an operating frequency of at least one component included in the at least one SOC or a signal that triggers QOS control of the at least one SOC.

According to an embodiment of the present disclosure, the power management method may further include monitoring, by the board level management module, the average power consumption of the at least one SOC according to a predetermined period after transmitting the first control signal, determining, by the board level management module, whether the monitored average power consumption is within the threshold range, and transmitting, by the board level management module, a second control signal related to an increase of power consumption of the at least one SOC to the at least one SOC in response to determining that the average power consumption is not within the threshold range.

According to an embodiment of the present disclosure, the power management method may further include acquiring, by the board level management module, information regarding average power consumption from at least one ADC.

According to an embodiment of the present disclosure, the at least one SOC may include at least one first pin connected to at least one first power domain related to a compute workload and at least one second pin connected to at least one second power domain related to a memory workload, and the board level management module may include a plurality of third pins respectively connected to the at least one first pin and the at least one second pin.

According to an embodiment of the present disclosure, the power management method may further include acquiring, by the board level management module, information regarding power consumption of the at least one first power domain from at least one first ADC corresponding to the at least one first power domain and acquiring, by the board level management module, information regarding power consumption of the at least one second power domain from at least one second ADC corresponding to the at least one second power domain.

According to an embodiment of the present disclosure, the power management method may further include identifying, by the board level management module, that power consumption of the at least one first power domain related to the compute workload is greater than power consumption of the at least one second power domain related to the memory workload based on information regarding power consumption of each of the at least one first power domain and the at least one second power domain, and determining, by the board level management module, at least one fourth pin connected to the at least one first pin among the plurality of third pins as a pin for transmitting the first control signal in response to identifying that power consumption of the at least one first power domain is greater.

According to an embodiment of the present disclosure, the power management method may further include identifying, by the board level management module, that power consumption of the at least one second power domain related to the memory workload is greater than power consumption of the at least one first power domain related to the compute workload based on information regarding power consumption of each of the at least one first power domain and the at least one second power domain, and determining, by the board level management module, at least one fourth pin connected to the at least one second pin among the plurality of third pins as a pin for transmitting the first control signal in response to identifying that power consumption of the at least one second power domain is greater.

According to an embodiment of the present disclosure, a computer program stored in a computer-readable recording medium for executing the power management method on a computer may be provided.

According to various embodiments of the present disclosure, a mechanism capable of dynamically controlling power consumption during a task duration of an SOC may be provided by using components configured independently from the SOC.

According to various embodiments of the present disclosure, components configured independently of the SOC provide an interrupt to the SOC only when power consumption control of the SOC is determined, thereby minimizing an impact on task performance of the SOC.

Effects of the present disclosure are not limited to the effects mentioned above, and other effects not mentioned will be clearly understood by those skilled in the art from the description of the claims.

BRIEF DESCRIPTION OF THE DRAWINGS

Various embodiments of the present disclosure will be described with reference to the following drawings, and the same or similar reference numerals may be assigned to the same or corresponding components in connection with the description of the drawings.

DETAILED DESCRIPTION

Figure 1:
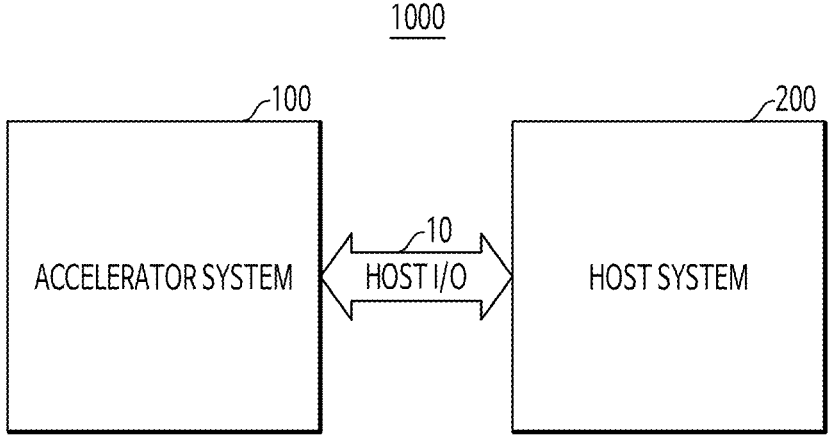
FIG. 1 illustrates an example of a computing device according to an embodiment of the present disclosure.

Hereinafter, specific details for implementation of the present disclosure will be described in detail with reference to the accompanying drawings. However, in the following description, if there is a risk of unnecessarily obscuring the gist of the present disclosure, detailed descriptions of well-known functions or configurations will be omitted.

In the accompanying drawings, the same or corresponding components are assigned with the same reference numerals. In addition, in the description of the following embodiments, redundant description of the same or corresponding components may be omitted. However, even if descriptions of components are omitted, it is not intended that such components are not included in certain embodiments.

Advantages and features of the disclosed embodiments and methods for achieving them will become clear with reference to the embodiments described later together with the accompanying drawings. However, the present disclosure is not limited to the embodiments disclosed below but may be implemented in various different forms, and these embodiments are only provided to make the present disclosure complete and to completely inform those skilled in the art of the scope of the invention.

Terms used in the present disclosure will be briefly described, and the disclosed embodiments will be described in detail. The terms used in the present disclosure have been selected as general terms currently widely used as much as possible while considering functions in the present disclosure, but this may vary depending on the intention of a technician engaged in the relevant field, precedents, or emergence of new technologies. In addition, in certain cases, there are terms arbitrarily selected by the applicant, and in this case, the meaning will be described in detail in the description part of the corresponding invention. Therefore, the terms used in the present disclosure should be defined based on the meaning of the terms and the content throughout the present disclosure, rather than just the names of the terms.

In the present disclosure, expressions in the singular include expressions in the plural unless the context clearly specifies otherwise. In addition, expressions in the plural include expressions in the singular unless the context clearly specifies otherwise. Throughout the present disclosure, when a part is said to include a component, it means that other components are not excluded but may be further included unless specifically stated otherwise.

The term 'module' or 'unit' used in the present disclosure means a software or hardware component, and the 'module' or 'unit' performs certain roles. However, 'module' or 'unit' is not limited to software or hardware. A 'module' or 'unit' may be configured to be in an addressable storage medium or may be configured to reproduce one or more processors. Therefore, as an example, a 'module' or 'unit' may include components such as software components, object-oriented software components, class components, and task components, and at least one of processes, functions, attributes, procedures, subroutines, segments of program code, drivers, firmware, microcode, circuits, data, databases, data structures, tables, arrays, or variables. Functions provided within components and 'modules' or 'units' may be combined into a smaller number of components and 'modules' or 'units' or further separated into additional components and 'modules' or 'units'.

According to an embodiment, a 'module' or 'unit' may be implemented with a processor and a memory. A 'processor' should be interpreted broadly to include general-purpose processors, central processing units (CPUs), microprocessors, digital signal processors (DSPs), controllers, microcontrollers, state machines, and the like. In some environments, a 'processor' may also refer to application-specific integrated circuits (ASICs), programmable logic devices (PLDs), field-programmable gate arrays (FPGAs), and the like. A 'processor' may also refer to a combination of processing devices, such as, for example, a combination of a DSP and a microprocessor, a combination of a plurality of microprocessors, a combination of one or more microprocessors in conjunction with a DSP core, or any other such combination of configurations. In addition, a 'memory' should be interpreted broadly to include any electronic component capable of storing electronic information. A 'memory' may also refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and the like. If a processor can read information from and/or write information to a memory, the memory is said to be in electronic communication with the processor. A memory integrated into a processor is in electronic communication with the processor.

Terms such as first, second, A, B, (a), (b) used in the present disclosure are only used to distinguish one component from another, and the nature, sequence, or order of the corresponding component is not limited by the term.

When it is described in the present disclosure that a component is 'connected', 'coupled', or 'accessed' to another component, the component may be directly connected or accessed to the other component, but it should be understood that another component may be 'connected', 'coupled', or 'accessed' between each component.

'Include' and/or 'including' used in the present disclosure does not exclude the presence or addition of one or more other components, steps, operations, and/or elements to the mentioned components, steps, operations, and/or elements.

FIG. 1 illustrates an example of a computing device according to an embodiment of the present disclosure.

Referring to FIG. 1, a computing device 1000 according to an embodiment may include an accelerator system 100, a host system 200, and a host interface 10. In an embodiment, the accelerator system 100 may include a device and/or a system that performs a specific task using an artificial neural network. For example, the accelerator system 100 may include a device and/or a system specialized in performing computationally intensive tasks such as deep learning. In various embodiments, the accelerator system 100 may be implemented as at least one of a peripheral component interconnect (PCI) card device or a PCI express (PCIe) card device that can be operated by being connected to (or mounted on) a slot provided by the host system 200, but the present disclosure is not limited thereto.

According to an embodiment, the accelerator system 100 is connected to the host system 200 based on the host interface 10, receives a command related to the execution of a computational task from the host system 200, and may transmit an execution result of the computational task to the host system 200 through an interrupt request (IRQ). According to various embodiments, the host interface 10 may include at least one of PCI or PCIe.

Figure 2:
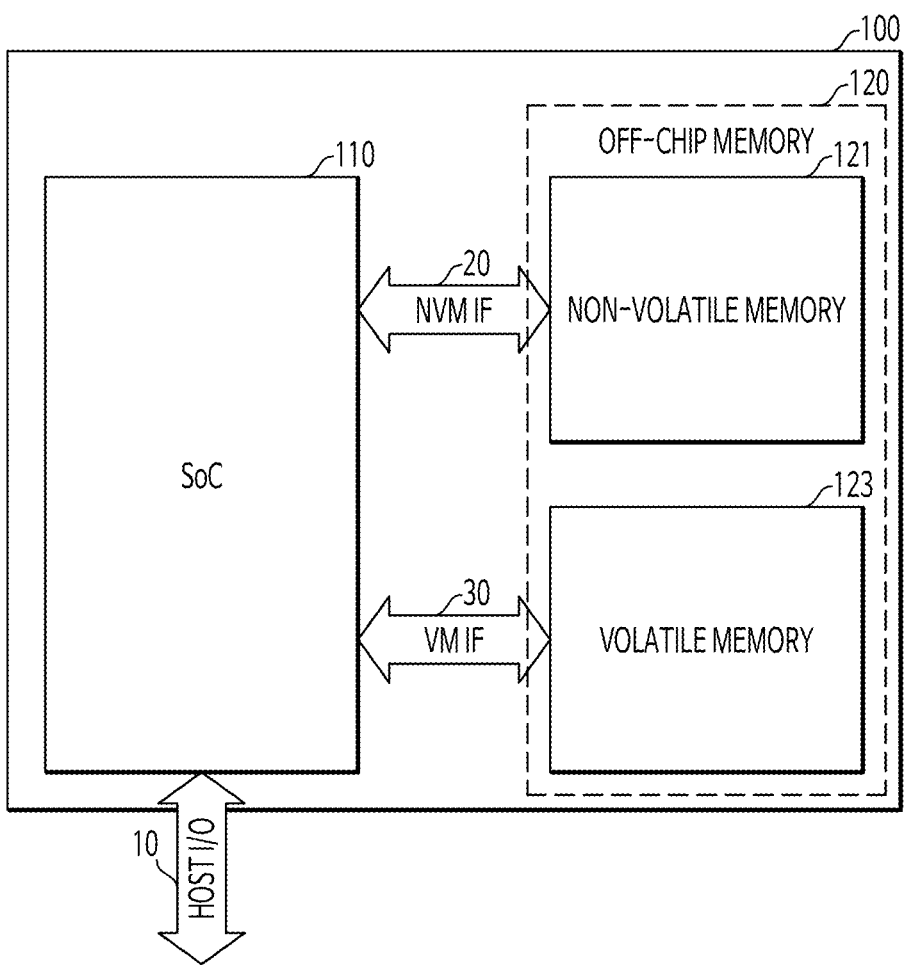
FIG. 2 illustrates an example of some components of an accelerator system according to an embodiment of the present disclosure.

FIG. 2 illustrates an example of some components of an accelerator system according to an embodiment of the present disclosure.

Referring to FIG. 2, an accelerator system 100 according to an embodiment may include an SOC (system on chip) 110, a memory 120, a non-volatile memory interface 20, and a volatile memory interface 30. According to various embodiments, the accelerator system 100 may additionally include at least one other component in addition to the components described above. In FIG. 2, the accelerator system 100 is shown as including one SOC 110, but this is for convenience of description, and according to various embodiments, the accelerator system 100 may include a plurality of SOCs. In various embodiments described below, the SOC 110 may be referred to as at least one SOC 110.

In an embodiment, the at least one SOC 110 may include an accelerator that provides specialized computation and/or inference performance for a specific task using an artificial neural network. For example, the at least one SOC 110 may include at least one of a graphics processing unit (GPU), a tensor processing unit (TPU), an application specific integrated circuit (ASIC), a field programmable gate array (FPGA), a neural processing unit (NPU), or a central processing unit (CPU).

In an embodiment, the memory 120 may store various commands, data, and/or information related to a functional operation of at least one component (for example, the at least one SOC 110) of the accelerator system 100. For example, the memory 120 may store commands, data, and/or information received from a host system (for example, the host system 200 of FIG. 1) in connection with task performance of the at least one SOC 110 in a volatile memory 123, and store data and/or information related to a processing result of the corresponding command, data, and/or information in a non-volatile memory 121.

In various embodiments, the non-volatile memory 121 may include at least one of read-only memory (ROM), programmable ROM (PROM), erasable alterable ROM (EAROM), erasable programmable ROM (EPROM), electrically erasable programmable ROM (EEPROM) (for example, NAND flash memory and/or NOR flash memory), ultra-violet erasable programmable ROM (UVEPROM), ferroelectric random access memory (FeRAM), magnetoresistive RAM (MRAM), phase-change RAM (PRAM), silicon-oxide-nitride-oxide-silicon (SONOS), resistive RAM (RRAM), nanotube RAM (NRAM), magnetic computer storage devices (for example, hard disks, diskette drives, and/or magnetic tapes), optical disk drives, or 3D XPoint memory. In various embodiments, the volatile memory 123 may include at least one of dynamic RAM (DRAM), static RAM (SRAM), synchronous dynamic RAM (SDRAM), or double data rate SDRAM (DDR SDRAM).

According to various embodiments, the memory 120 may also be referred to as an off-chip memory in the sense that the memory 120 is disposed outside the at least one SOC 110.

In an embodiment, each of the non-volatile memory interface 20 and the volatile memory interface 30 may support a connection between the at least one SOC 110 and the non-volatile memory 121 and a connection between the at least one SOC 110 and the volatile memory 123. In various embodiments, the non-volatile memory interface 20 may include at least one of parallel advanced technology attachment (PATA), small computer system interface (SCSI), serial attached SCSI (SAS), serial advanced technology attachment (SATA), PCI, or PCIe. In various embodiments, the volatile memory interface 30 may include at least one of single data rate (SDR), double data rate (DDR), quad data rate (QDR), eXtreme data rate (XDR), or octal data rate (ODR).

Figure 3:
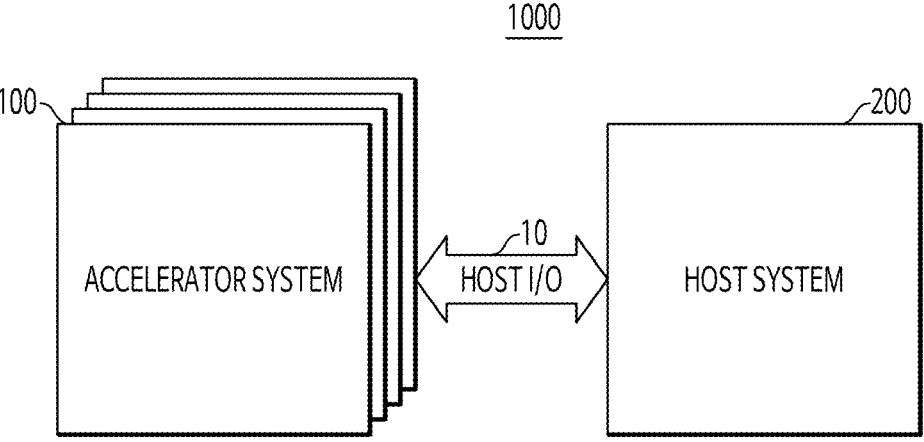
FIG. 3 illustrates another example of a computing device according to an embodiment of the present disclosure.

FIG. 3 illustrates another example of a computing device according to an embodiment of the present disclosure.

Referring to FIG. 3, a computing device 1000 according to an embodiment may include a plurality of accelerator systems 100, a host system 200, and at least one host interface 10. For example, each of the plurality of accelerator systems 100 may be connected to the host system 200 based on a corresponding host interface 10.

According to various embodiments, the computing device 1000 may further include at least one interface connecting at least some of the plurality of accelerator systems 100. In this case, at least some of the plurality of accelerator systems 100 may transmit and receive signals, data, and/or information based on the at least one interface. For example, at least some of the plurality of accelerator systems 100 may exchange signals, data, and/or information independently of the host system 200.

Figure 4:
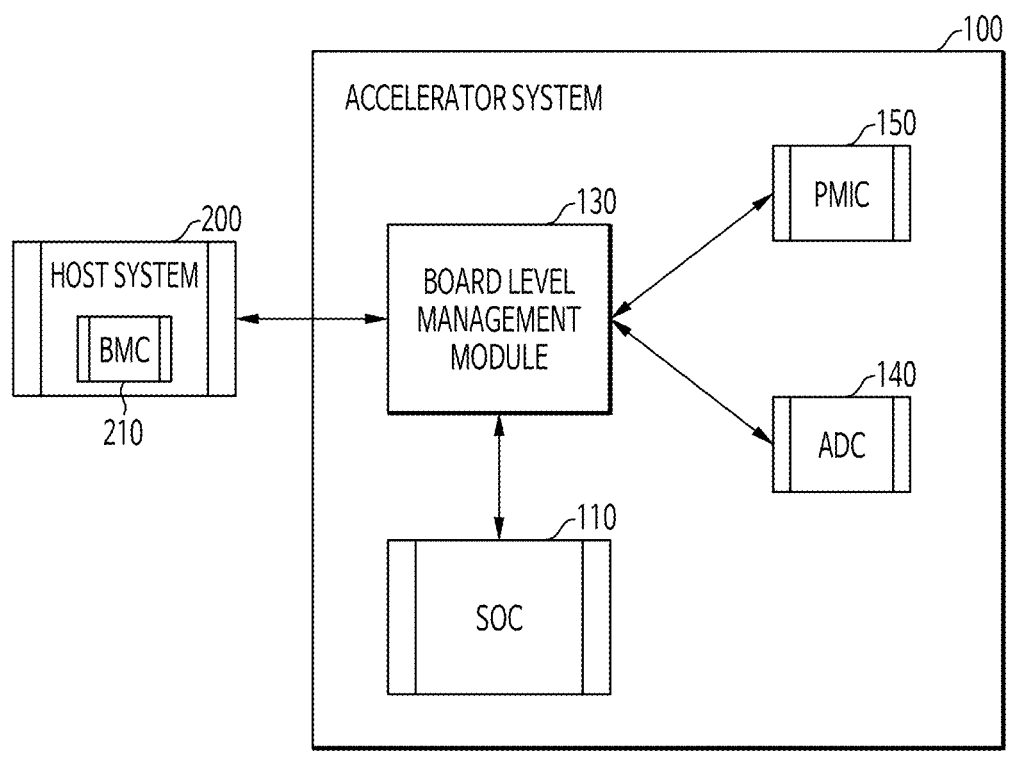
FIG. 4 illustrates an example of some other components of an accelerator system according to an embodiment of the present disclosure.
Figure 5:
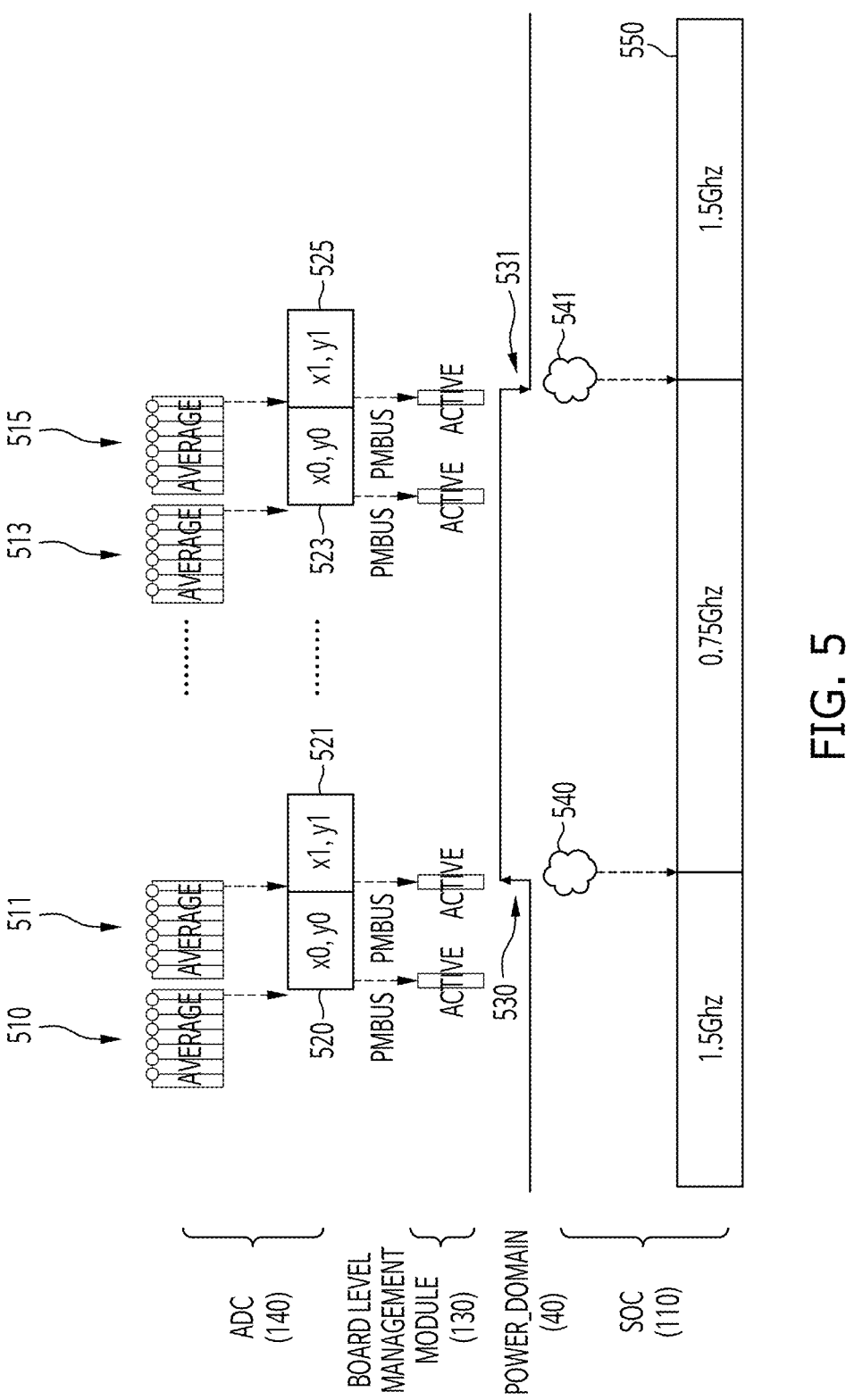
FIG. 5 illustrates an example of an operation diagram of an accelerator system according to an embodiment of the present disclosure.

FIG. 4 illustrates an example of some other components of an accelerator system according to an embodiment of the present disclosure. FIG. 5 illustrates an example of an operation diagram of an accelerator system according to an embodiment of the present disclosure.

Referring to FIG. 4 and FIG. 5, an accelerator system 100 according to an embodiment may include components related to dynamic control for power consumption of at least one SOC 110. For example, the accelerator system 100 may further include a board level management module 130 configured independently from the at least one SOC 110 (for example, disposed outside the at least one SOC 110), at least one analog to digital converter (ADC) 140, and a power management integrated circuit (PMIC) 150. According to various embodiments, the board level management module 130 may be implemented with at least one of a microprocessor, a microcontroller, a digital signal processor, or an ASIC, but the present disclosure is not limited thereto.

In various embodiments, at least some of components included in the accelerator system 100 may be connected to each other through a bus, a general purpose input and output (GPIO), a serial peripheral interface (SPI), or a mobile industry processor interface (MIPI) to exchange commands, signals, data, and/or information. According to various embodiments, some of the components of the accelerator system 100 may be integrated into one component. For example, the at least one ADC 140 may be included in the PMIC 150.

According to an embodiment, the at least one ADC 140 (or, the PMIC 150) may measure the average power consumption of each of the at least one SOC 110 while the respective at least one SOC 110 performs a specific task. For example, the at least one ADC 140 may measure and average power consumptions of the corresponding SOC 110 based on a predetermined sampling period (for example, the number of samplings per second) during a duration in which at least one component included in the at least one SOC 110 has an active state or a peak state according to execution of a task. Accordingly, the at least one ADC 140 may generate (or, output) data 520, 521, 523, and/or 525 regarding average power consumption of each of the at least one SOC 110 for each sampling period 510, 511, 513, and/or 515. According to an embodiment, the data 520, 521, 523, and/or 525 regarding the average power consumption of each of the at least one SOC 110 generated by the at least one ADC 140 may be configured as a combination of sampling index information (for example, X) and average power consumption information (for example, Y) in the corresponding sampling period, and may be at least temporarily stored in a storage device (for example, a register and/or a buffer) included in the corresponding ADC 140 or accessible by the ADC 140.

In an embodiment, the board level management module 130 may monitor average power consumption of each of the at least one SOC 110 according to a predetermined monitoring period during a duration of a task in response to the specific task being executed in the at least one SOC 110. In this regard, the board level management module 130 may be switched from a sleep state to an active state according to the monitoring period, and may acquire data 520, 521, 523, and/or 525 regarding average power consumption through an interface with the at least one ADC 140 (for example, a power management bus (PMBus)) while in the active state. Alternatively, data 520, 521, 523, and/or 525 regarding average power consumption generated by the at least one ADC 140 may be transmitted to the board level management module 130 as an IRQ through an interface, and the board level management module 130 may be switched to the active state in response to receiving data 520, 521, 523, and/or 525 regarding average power consumption. According to various embodiments, a monitoring period of the board level management module 130 for average power consumption of each of the at least one SOC 110 and a sampling period in which the at least one ADC 140 measures the average power consumption may be configured to have the same or similar cycle time.

According to an embodiment, As at least part of monitoring the average power consumption for each of the at least one SOC 110, the board level management module 130 may compare data 520, 521, 523, and/or 525 regarding the average power consumption with a power consumption budget predefined for a duration of a task performed by a corresponding SOC 110. In this regard, the board level management module 130 may receive information regarding a power consumption budget defined for a task duration of the at least one SOC 110 performing a task from the host system 200 through an interface (for example, the host interface 10 of FIG. 1) connected to the host system 200. For example, the board level management module 130 may receive information regarding the power consumption budget from a baseboard management controller (BMC) 210 operating independently from a main processor in the host system 200. In various embodiments, the power consumption budget related to the at least one SOC 110 performing the task is a standard defined by the peripheral component interconnect special interest group (PCI-SIG), and may be defined based on the duration of the task. For example, if the duration of the task is long, the power consumption budget may be defined as low so that stability of the SOC 110 is guaranteed, and conversely, if the duration of the task is short, the power consumption budget may be defined high as high so that task performance of the SOC 110 is improved.

According to various embodiments, the board level management module 130 may receive information regarding a power consumption budget determined according to predicted power consumption of a workload related to the execution of a corresponding task from the host system 200 prior to the execution of the task by the at least one SOC 110. For example, the board level management module 130 may enter a sleep state after receiving information regarding the power consumption budget from the host system 200, and may switch to an active state according to a monitoring period during a duration of the corresponding task once the execution of a task by the at least one SOC 110 is initiated. In addition, while in an active state according to the monitoring period, the board level management module 130 may receive updated information regarding the power consumption budget related to thermal control for the at least one SOC 110 performing the task from the host system 200.

In an embodiment, the board level management module 130 may compare data 520, 521, 523, and/or 525 regarding average power consumption with the power consumption budget to determine whether the average power consumption is within a predetermined threshold range. For example, the board level management module 130 may determine, based on data 520, 521, 523, and/or 525 regarding average power consumption acquired according to a predetermined monitoring period during a task duration of the at least one SOC 110, whether average power consumption of a predetermined monitoring period is within a threshold range (for example, any range between greater than or equal to 95% and less than 100% of the power consumption budget) determined based on a power consumption budget for a duration.

According to an embodiment, the board level management module 130 may transmit a first control signal 530 (for example, an assert signal) related to reduction of power consumption to a corresponding SOC 110 via IRQ in response to determining that average power consumption of a predetermined monitoring period is within a threshold range. As an example, if the board level management module 130 determines that the average power consumption is within the threshold range based on data regarding average power consumption (for example, 521) acquired in a specific monitoring period, the board level management module 130 may determine at least one specific power domain 40 included in the corresponding SOC 110 and transmit the first control signal 530 to a signal route related to the corresponding power domain. Embodiments related to determination of at least one specific power domain 40 will be described later with reference to FIG. 6 to FIG. 9.

In an embodiment, the first control signal 530 transmitted by the board level management module 130 may trigger power consumption reduction control of the SOC 110 related to average power consumption within the threshold range. For example, the SOC 110 receiving the first control signal 530 may execute a first IRQ processing routine 540 to at least temporarily suspend a task being executed, and may perform control to reduce an operating frequency 550 (or, a clock frequency) of at least one component related to at least one specific power domain 40 according to the first control signal 530. Additionally or alternatively, the SOC 110 receiving the first control signal 530 may perform QOS (quality of service) control for allocating memory resources according to priority for at least one component related to at least one specific power domain 40 according to the first control signal 530. According to various embodiments, a level at which the operating frequency 550 of at least one component is reduced and/or a priority for the at least one component may be variously determined according to settings based on an operation policy of the corresponding SOC 110 and/or user settings.

According to an embodiment, after transmitting the first control signal 530, the board level management module 130 may monitor average power consumption of the at least one SOC 110 according to a specified monitoring period. For example, the board level management module 130 may determine, based on data regarding average power consumption (523 and/or 525) acquired from the at least one ADC 140, whether the average power consumption of the SOC 110 that has received the first control signal 530 is within the threshold range.

In an embodiment, the board level management module 130 may transmit a second control signal 531 (for example, a de-assert signal) related to an increase of power consumption to the SOC 110 that has received the first control signal 530 via an IRQ in response to determining that average power consumption of a predetermined monitoring period is not within the threshold range. As an example, upon determining that the average power consumption of a predetermined monitoring period is not within the threshold range based on data regarding average power consumption (for example, 525) acquired in a specific monitoring period, the board level management module 130 may transmit the second control signal 531 through a signal route related to at least one specific power domain 40 of the corresponding SOC 110.

In an embodiment, the second control signal 531 transmitted by the board level management module 130 may trigger power consumption increase control of the SOC 110 that has received the first control signal 530. For example, the SOC 110 receiving the second control signal 531 may execute a second IRQ processing routine 541 to at least temporarily suspend a task being executed, and may perform control to revert (or, increase) the operating frequency 550 of at least one component related to at least one specific power domain 40 to a state prior to the reduction control according to the first control signal 530, or may perform control to revert the QOS control for the at least one component to a previous setting state.

Figure 6:
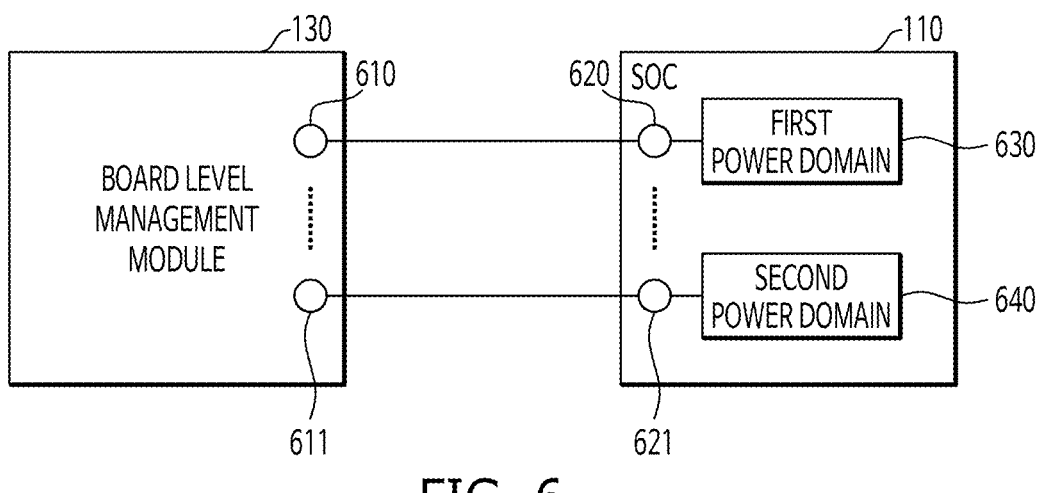
FIG. 6 illustrates an example of a connection structure between a board level management module and an SOC according to an embodiment of the present disclosure.
Figure 7:
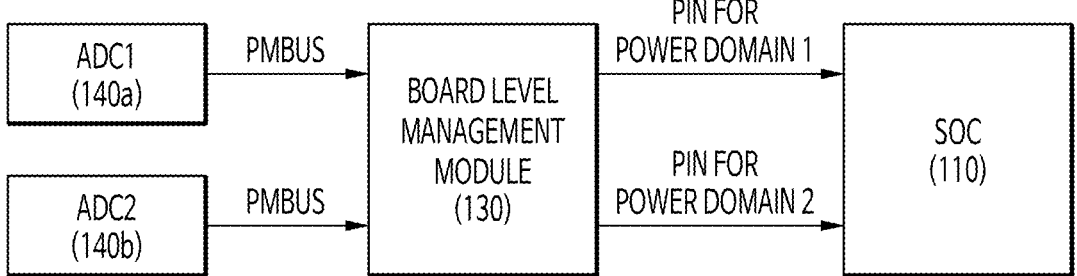
FIG. 7 illustrates an example of a signal route between an ADC, a board level management module, and an SOC according to an embodiment of the present disclosure.
Figure 8:
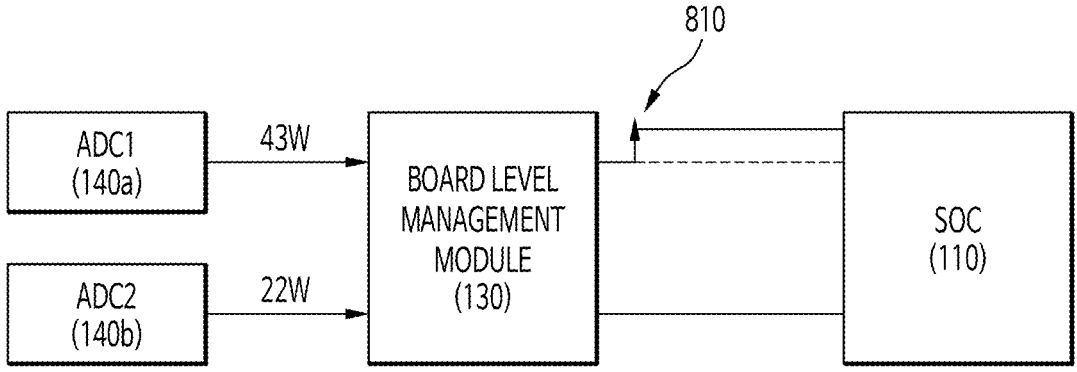
FIG. 8 illustrates an example of first control signal transmission according to an embodiment of the present disclosure.
Figure 9:
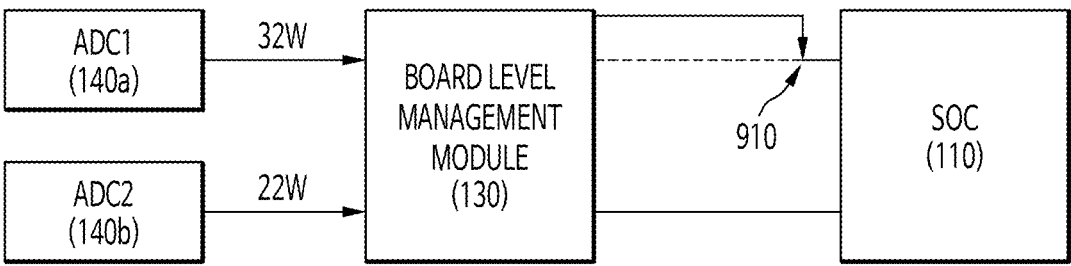
FIG. 9 illustrates an example of second control signal transmission according to an embodiment of the present disclosure.

FIG. 6 illustrates an example of a connection structure between a board level management module and an SOC according to an embodiment of the present disclosure. FIG. 7 illustrates an example of a signal route between an ADC, a board level management module, and an SOC according to an embodiment of the present disclosure. FIG. 8 illustrates an example of first control signal transmission according to an embodiment of the present disclosure. FIG. 9 illustrates an example of second control signal transmission according to an embodiment of the present disclosure.

Referring to FIG. 6, at least one SOC 110 according to an embodiment may include a plurality of pins 620 and 621 (for example, GPIO pins) supporting a connection (for example, an electrical connection) with a board level management module 130. In this regard, each of the plurality of pins of the at least one SOC 110 may be connected (or, mapped) to a plurality of power domains designed to logically distinguish voltages and/or power rails inside the corresponding SOC 110. For example, among the plurality of pins, at least one first pin 620 is connected to at least one first power domain 630 related to a compute workload, and at least one second pin 621 may be connected to at least one second power domain 640 related to a memory workload.

In an embodiment, the board level management module 130 may include a plurality of pins 610 and 611 (for example, GPIO pins) connected one-to-one with each of the plurality of pins 620 and 621 of the at least one SOC 110. For example, the board level management module 130 may include a plurality of pins including at least one third pin 610 connected to the at least one first pin 620 and at least one fourth pin 611 connected to the at least one second pin 621. According to various embodiments, in terms of the plurality of pins of the board level management module 130 and the plurality of pins of the at least one SOC 110 being connected one-to-one, a combination of pins connected to each other (for example, the at least one first pin 620 and the at least one third pin 610 and/or the at least one second pin 621 and the at least one fourth pin 611) may be referred to as a single pin.

Referring to FIG. 6 and FIG. 7, in connection with determination of a signal route for transmitting a first control signal (for example, the first control signal 530 of FIG. 5) and/or a second control signal (for example, the second control signal 531 of FIG. 5), the board level management module 130 according to an embodiment may acquire information regarding power consumption of each of at least one first power domain 630 and at least one second power domain 640 included in at least one SOC 110. In this regard, at least one ADC (for example, the at least one ADC 140 of FIG. 4) of an accelerator system (for example, the accelerator system 200 of FIG. 4) according to an embodiment may include at least one first ADC 140a corresponding to (or, connected to) the at least one first power domain 630 of the SOC 110 and at least one second ADC 140b corresponding to the at least one second power domain 640 of the SOC 110. In an embodiment, the board level management module 130 may request information regarding power consumption of a corresponding at least one power domain to each of the at least one first ADC 140a and the at least one second ADC 140b according to a predetermined monitoring period during a task duration of the at least one SOC 110. Accordingly, the board level management module 130 may acquire information regarding power consumption through an interface (for example, PMBus) with the corresponding at least one ADC. In this regard, each of the at least one first ADC 140a and the at least one second ADC 140b may calculate power consumption of a corresponding at least one power domain by measuring a voltage supplied to the corresponding at least one power domain and measuring a voltage drop according to a sensing resistance on a power rail related to the power domain (or, measuring a current according to the voltage drop).

According to an embodiment, the board level management module 130 may determine a pin for transmitting the first control signal 530 among the plurality of pins 610 and 611 of the board level management module 130 based on information regarding power consumption of the at least one first power domain 630 and information regarding power consumption of the at least one second power domain 640. For example, referring to FIG. 6, FIG. 7, FIG. 8, and FIG. 9, the board level management module 130 may determine that average power consumption of the SOC 110, identified according to a predetermined monitoring period during a task duration of the at least one SOC 110, is within a threshold range based on a power consumption budget defined for the task duration. In addition, the board level management module 130 may identify that the power consumption (for example, 43 W) of the at least one first power domain 630 related to a compute workload of the at least one SOC 110 is greater than the power consumption (for example, 22 W) of the at least one second power domain 640 related to the memory workload of the at least one SOC 110. In this case, the board level management module 130 may transmit (810) the first control signal 530 through at least one third pin 610 (for example, PIN FOR POWER DOMAIN1) connected to the at least one first pin 620 of the SOC 110 among the plurality of pins 610 and 611 included in the board level management module 130. Similarly, after transmitting (810) the first control signal 530, if the board level management module 130 determines that the average power consumption of the SOC 110 that has received the first control signal 530 is not within the threshold range by monitoring the average power consumption, the board level management module 130 may transmit (910) the second control signal 531 through the at least one third pin 610 through which the first control signal 530 was transmitted (810). In contrast, if the power consumption of the at least one second power domain 640 related to the memory workload of the at least one SOC 110 is greater than the power consumption of the at least one first power domain 630 related to the compute workload of the at least one SOC 110, the board level management module 130 may transmit the first control signal 530 and/or the second control signal 531 through at least one fourth pin 611 (for example, PIN FOR POWER DOMAIN2) connected to the at least one second pin 621 of the SOC 110 among the plurality of pins 610 and 611.

Figure 10:
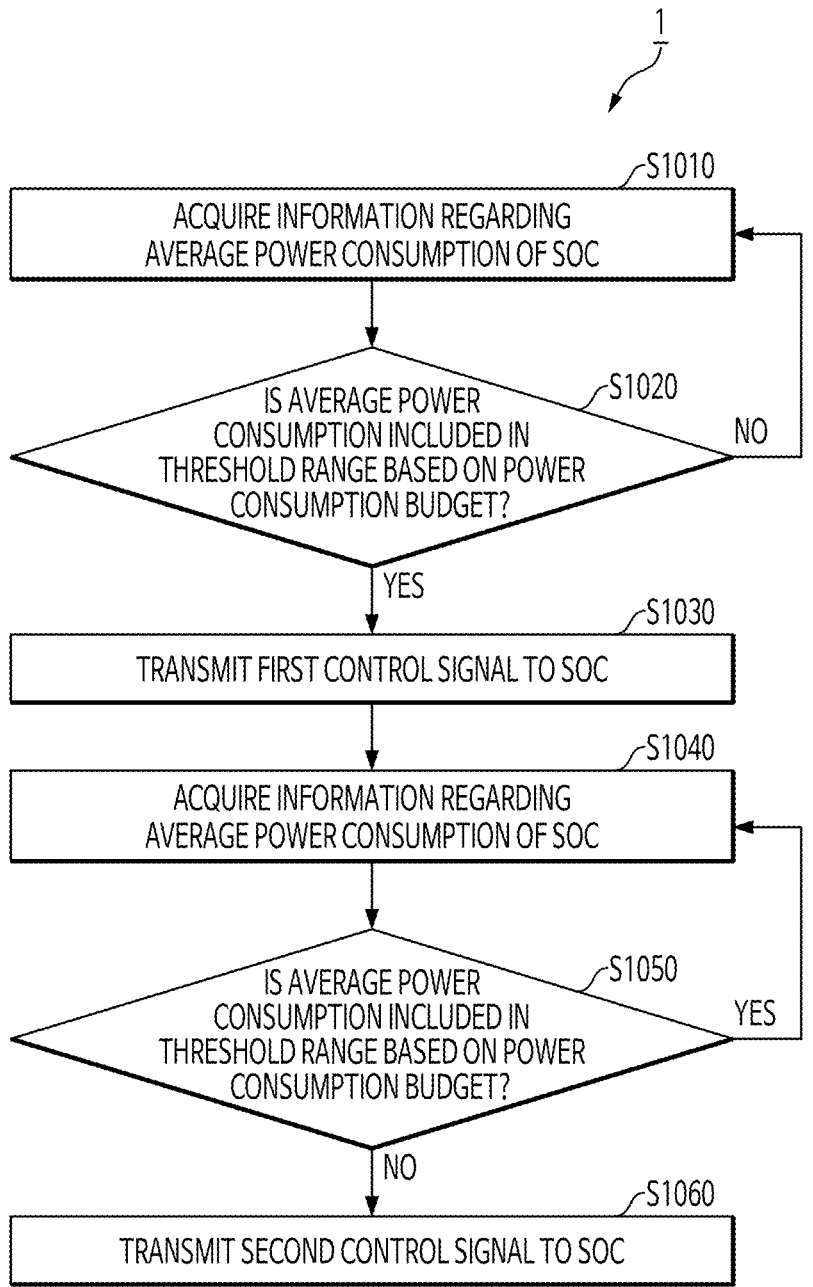
FIG. 10 illustrates an example of an operation sequence of a board level management module according to an embodiment of the present disclosure.

FIG. 10 illustrates an example of an operation sequence of a board level management module according to an embodiment of the present disclosure.

Steps of an operation sequence (1) of a board level management module described in an embodiment of FIG. 10 may be performed sequentially or non-sequentially. For example, an execution order of steps described in the embodiment of FIG. 10 may be changed, some steps may be performed repeatedly, or at least two steps may be performed in parallel. In addition, at least some of the steps described in the embodiment of FIG. 10 may include operations same as or similar to operations of a board level management module described through previous drawings, and redundant descriptions for same or similar operations may be omitted below.

Referring to FIG. 10, in step S1010, a board level management module according to an embodiment (for example, the board level management module 130 of FIG. 4) may acquire information regarding average power consumption of each of at least one SOC (for example, the at least one SOC 110 of FIG. 4). For example, in response to the specific task being executed in the at least one SOC 110, the board level management module 130 may acquire information regarding average power consumption from at least one ADC (for example, the at least one ADC 140 of FIG. 4) according to a predetermined monitoring period during a duration of the task.

In step S1020, the board level management module 130 according to an embodiment may determine whether the average power consumption of the at least one SOC 110 is within or included in a threshold range based on a power consumption budget. For example, the board level management module 130 may determine, based on a power consumption budget predefined for a duration of a task based on information regarding average power consumption acquired according to a monitoring period, whether the average power consumption of a predetermined monitoring period is within a threshold range (for example, any range between greater than or equal to 95% and less than 100% of the power consumption budget) predefined for the duration of the task.

In step S1030, in response to determining that average power consumption over a predetermined monitoring period is within a threshold range, the board level management module 130 according to an embodiment may transmit a first control signal (for example, an assert signal) related to reduction of power consumption via an IRQ to the SOC 110 related to the average power consumption within the threshold range. In this operation, the board level management module 130 may determine a signal route for transmitting the first control signal. In this regard, the board level management module 130 may acquire information regarding power consumption of at least one power domain of the SOC 110 from at least one ADC 140 corresponding the SOC 110. In an embodiment, if the board level management module 130 identifies that the power consumption of at least one first power domain related to a compute workload of the at least one SOC 110 is greater than the power consumption of at least one second power domain related to a memory workload, the board level management module 130 may transmit the first control signal through at least one third pin connected to at least one first pin related to the first power domain of the SOC 110 among a plurality of pins included in the board level management module 130. In contrast, if the board level management module 130 identifies that the power consumption of the at least one second power domain related to the memory workload of the at least one SOC 110 is greater than the power consumption of the at least one first power domain related to the compute workload, the board level management module 130 may transmit the first control signal through at least one fourth pin connected to at least one second pin related to the second power domain of the SOC 110 among the plurality of pins.

In step S1040, the board level management module 130 according to an embodiment may acquire information regarding average power consumption of the at least one SOC 110 after transmitting the first control signal. For example, the board level management module 130 may acquire information regarding average power consumption from the at least one ADC 140 according to a predetermined monitoring period during a task duration of the at least one SOC 110.

In step S1050, the board level management module 130 according to an embodiment may determine whether average power consumption of the at least one SOC 110 is within or included in the threshold range based on the acquired information regarding average power consumption. For example, the board level management module 130 may determine whether average power consumption of the SOC 110 that has received the first control signal is within the threshold range.

In step S1060, in response to determining that the average power consumption of a predetermined monitoring period is not within the threshold range, the board level management module 130 according to an embodiment may transmit, via an IRQ, a second control signal (for example, a de-assert signal) related to an increase of power consumption to the SOC 110 that has received the first control signal. For example, the board level management module 130 may transmit the second control signal to the corresponding SOC 110 through at least one third pin or at least one fourth pin through which the first control signal was transmitted.

Figure 11:
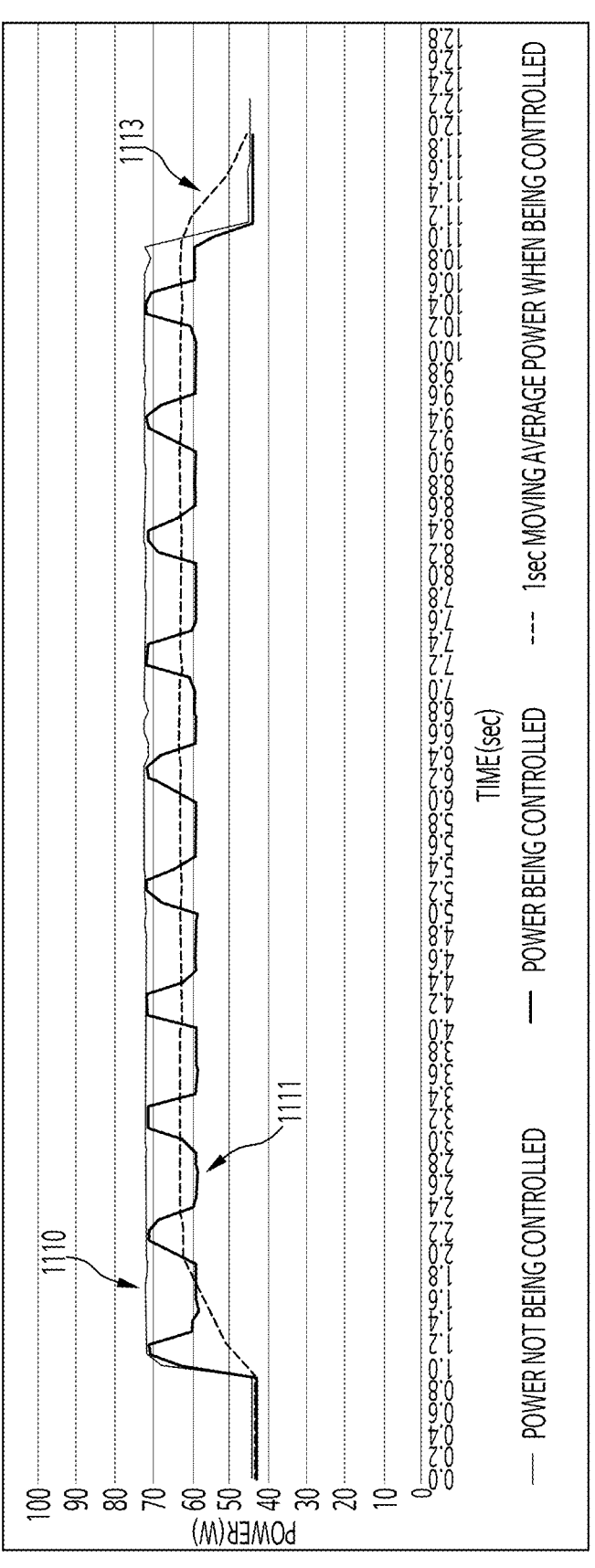
FIG. 11 illustrates an example of a load profile of an SOC according to an embodiment of the present disclosure.

FIG. 11 illustrates an example of a load profile of an SOC according to an embodiment of the present disclosure.

Referring to FIG. 11, a board level management module (for example, the board level management module 130 of FIG. 4) according to an embodiment monitors an average of power consumptions 1111 measured by at least one ADC (for example, the at least one ADC 140 of FIG. 4) according to a predetermined sampling period (for example, 10 ms) during a duration in which at least one SOC (for example, the at least one SOC 110 of FIG. 4) performs a specific task, and may dynamically control power consumption of the at least one SOC 110 (for example, transmission of a first control signal and/or a second control signal related to control of power consumption). In this case, it was confirmed that an average 1113 of power consumed by the at least one SOC 110 during a cycle time (1s) of the sampling period is lower than an average 1110 of power consumed during a cycle time of a sampling period by a comparison target SOC that is not controlled by the board level management module 130.

The above-described method may be provided as a computer program stored in a computer-readable recording medium for execution in a computer. A medium may continuously store a computer-executable program or temporarily store it for execution or download. In addition, a medium may be various recording means or storage means in a form in which single or several hardware are combined, and is not limited to a medium directly connected to any computer system, but may exist distributed on a network. Examples of a medium may include magnetic media such as hard disks, floppy disks, and magnetic tapes, optical recording media such as CD-ROM and DVD, magneto-optical media such as floptical disks, and those configured to store program commands including ROM, RAM, flash memory, and the like. In addition, examples of other media may include recording media or storage media managed by an app store that distributes applications or sites and servers that supply or distribute various other software.

Methods, operations, or techniques of the present disclosure may be implemented by various means. For example, these techniques may be implemented in hardware, firmware, software, or a combination thereof.

Those skilled in the art will understand that various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the specific application and design requirements imposed on the overall system. Those skilled in the art may implement the described functionality in varying ways for each specific application, but such implementation decisions should not be interpreted as causing a departure from the scope of the present disclosure.

In a hardware implementation, processing units used to perform the techniques may be implemented within one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, a computer, or a combination thereof.

Accordingly, various illustrative logical blocks, modules, and circuits described in connection with the present disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In firmware and/or software implementations, the techniques may be implemented with instructions stored on a computer-readable medium such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors and may cause the processor(s) to perform certain aspects of the functionality described in the present disclosure.

When implemented in software, the techniques described above may be stored as one or more instructions or code on a computer-readable medium or transmitted through a computer-readable medium. Computer-readable media include both computer storage media and communication media including any medium that facilitates transfer of a computer program from one place to another. Storage media may be any available media that can be accessed by a computer. By way of non-limiting example, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium.

For example, if software is transmitted from a website, server, or other remote source using coaxial cable, fiber optic cable, twisted pair, digital subscriber line (DSL), or wireless technologies such as infrared, radio, and microwave, then coaxial cable, fiber optic cable, twisted pair, digital subscriber line, or wireless technologies such as infrared, radio, and microwave are included within the definition of medium. Disk and disc, as used herein, includes CD, laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to a processor such that the processor can read information from, or write information to, the storage medium. In the alternative, the storage medium may be integrated into the processor. The processor and the storage medium may reside in an ASIC. The ASIC may reside in a user terminal. In the alternative, the processor and the storage medium may reside as discrete components in a user terminal.

Although the above-described embodiments have been described as utilizing aspects of the currently disclosed subject matter in one or more standalone computer systems, the present disclosure is not limited thereto, and may be implemented in connection with any computing environment such as a network or distributed computing environment. Furthermore, aspects of the subject matter in the present disclosure may be implemented in a plurality of processing chips or devices, and storage may be similarly affected across a plurality of devices. Such devices may include PCs, network servers, and handheld devices.

Although the present disclosure has been described in connection with some embodiments, various modifications and changes can be made without departing from the scope of the present disclosure that can be understood by those skilled in the art to which the invention of the present disclosure belongs. In addition, such modifications and changes should be considered to fall within the scope of the claims attached to the present disclosure.

What is claimed is:

1. An accelerator system, comprising:
at least one system on chip (SOC); and
a board level management module configured separately from the at least one SOC and connected to the at least one SOC, wherein the board level management module is configured to:
    monitor average power consumption of the at least one SOC according to a predetermined period during a duration of a task in response to the task being performed in the at least one SOC;
    determine whether the monitored average power consumption is within a threshold range determined based on a power consumption budget defined for the duration; and
    transmit, to the at least one SOC, a first control signal related to reduction of power consumption of the at least one SOC, in response to determining that the average power consumption is within the threshold range,
wherein the at least one SOC comprises:
    at least one first pin connected to at least one first power domain related to a compute workload; and
    at least one second pin connected to at least one second power domain related to a memory workload, and
wherein the board level management module comprises a plurality of third pins respectively connected to the at least one first pin and the at least one second pin,
at least one first analog to digital converter (ADC) corresponding to the at least one first power domain and at least one second ADC corresponding to the at least one second power domain,
wherein the board level management module is further configured to:

acquire information regarding power consumption of the at least one first power domain from the at least one first ADC, and
acquire information regarding power consumption of the at least one second power domain from the at least one second ADC.

2. The accelerator system as claimed in claim 1, further comprising a communication interface,
wherein the board level management module is further configured to receive information regarding the power consumption budget from an external electronic device through the communication interface.

3. The accelerator system as claimed in claim 1, wherein the first control signal comprises a signal that triggers reduction of an operating frequency of at least one component included in the at least one SOC.

4. The accelerator system as claimed in claim 1, wherein the first control signal comprises a signal that triggers quality of service (QOS) control of the at least one SOC.

5. The accelerator system as claimed in claim 1, wherein the board level management module is further configured to:
    monitor the average power consumption of the at least one SOC according to the predetermined period after transmitting the first control signal;
    determine whether the monitored average power consumption is within the threshold range; and
    transmit, to the at least one SOC, a second control signal related to an increase of power consumption of the at least one SOC, in response to determining that the average power consumption is not within the threshold range.

6. The accelerator system as claimed in claim 1,
wherein the board level management module is further configured to acquire information regarding the average power consumption from the at least one first ADC or the at least one second ADC.

7. The accelerator system as claimed in claim 1, wherein the board level management module is further configured to determine, based on information regarding power consumption of each of the at least one first power domain and the at least one second power domain, at least one fourth pin for transmitting the first control signal among the plurality of third pins.

8. The accelerator system as claimed in claim 7, wherein the board level management module is further configured to:
    identify, based on information regarding power consumption of each of the at least one first power domain and the at least one second power domain, that power consumption of the at least one first power domain related to the compute workload is greater than power consumption of the at least one second power domain related to the memory workload; and
    determine at least one pin connected to the at least one first pin among the plurality of third pins as the at least one fourth pin, in response to identifying that power consumption of the at least one first power domain is greater.

9. The accelerator system as claimed in claim 7, wherein the board level management module is further configured to:
    identify, based on information regarding power consumption of each of the at least one first power domain and the at least one second power domain, that power consumption of the at least one second power domain related to the memory workload is greater than power consumption of the at least one first power domain related to the compute workload; and determine at least one pin connected to the at least one second pin among the plurality of third pins as the at least one fourth pin, in response to identifying that power consumption of the at least one second power domain is greater.

10. A power management method of an accelerator system including at least one SOC and a board level management module configured separately from the at least one SOC and connected to the at least one SOC, the power management method comprising:

monitoring, by the board level management module, average power consumption of the at least one SOC according to a predetermined period during a duration of a task, in response to the task being performed in the at least one SOC;

determining, by the board level management module, whether the monitored average power consumption is within a threshold range determined based on a power consumption budget defined for the duration; and transmitting, by the board level management module, a first control signal related to reduction of power consumption of the at least one SOC to the at least one SOC, in response to determining that the average power consumption is within the threshold range, wherein the at least one SOC comprises:

at least one first pin connected to at least one first power domain related to a compute workload; and at least one second pin connected to at least one second power domain related to a memory workload, and wherein the board level management module comprises a plurality of third pins respectively connected to the at least one first pin and the at least one second pin, wherein the power management method further comprises:

acquiring, by the board level management module, information regarding power consumption of the at least one first power domain from at least one first analog to digital converter (ADC) corresponding to the at least one first power domain; and acquiring, by the board level management module, information regarding power consumption of the at least one second power domain from at least one second ADC corresponding to the at least one second power domain.

11. The power management method as claimed in claim 10, further comprising receiving, by the board level management module, information regarding the power consumption budget from an external electronic device.

12. The power management method as claimed in claim 10, wherein the first control signal comprises at least one of a signal that triggers reduction of an operating frequency of at least one component included in the at least one SOC or a signal that triggers QOS control of the at least one SOC.

13. The power management method as claimed in claim 10, further comprising:

monitoring, by the board level management module, the average power consumption of the at least one SOC according to the predetermined period after transmitting the first control signal;

determining, by the board level management module, whether the monitored average power consumption is within the threshold range; and transmitting, by the board level management module, a second control signal related to an increase of power consumption of the at least one SOC to the at least one SOC, in response to determining that the average power consumption is not within the threshold range.

14. The power management method as claimed in claim 10, further comprising acquiring, by the board level management module, information regarding the average power consumption from the at least one first ADC or the at least one second ADC.

15. The power management method as claimed in claim 10, further comprising:

identifying, by the board level management module, that power consumption of the at least one first power domain related to the compute workload is greater than power consumption of the at least one second power domain related to the memory workload, based on information regarding power consumption of each of the at least one first power domain and the at least one second power domain; and determining, by the board level management module, at least one fourth pin connected to the at least one first pin among the plurality of third pins as a pin for transmitting the first control signal, in response to identifying that power consumption of the at least one first power domain is greater.

16. The power management method as claimed in claim 10, further comprising:

identifying, by the board level management module, that power consumption of the at least one second power domain related to the memory workload is greater than power consumption of the at least one first power domain related to the compute workload, based on information regarding power consumption of each of the at least one first power domain and the at least one second power domain; and determining, by the board level management module, at least one fourth pin connected to the at least one second pin among the plurality of third pins as a pin for transmitting the first control signal, in response to identifying that power consumption of the at least one second power domain is greater.

* * * * *